US008502868B2

(12) United States Patent
Buehler et al.

(10) Patent No.: US 8,502,868 B2
(45) **Date of Patent: *Aug. 6, 2013**

(54) INTELLIGENT CAMERA SELECTION AND OBJECT TRACKING

(75) Inventors: Christopher J. Buehler, Cambridge, MA (US); Howard I. Cannon, Sudbury, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/426,815

(22) Filed: Mar. 22, 2012

(65) Prior Publication Data

US 2012/0206605 A1 Aug. 16, 2012

Related U.S. Application Data

(63) Continuation of application No. 11/388,759, filed on Mar. 24, 2006, now Pat. No. 8,174,572.

(60) Provisional application No. 60/665,314, filed on Mar. 25, 2005.

(51) Int. Cl.
*H04N 7/18* (2006.01)

(52) U.S. Cl.
USPC .......................................... 348/143; 348/159

(58) Field of Classification Search
None
See application file for complete search history.

(56) References Cited

U.S. PATENT DOCUMENTS

| | | | |
|---|---|---|---|
| 3,740,466 | A | 6/1973 | Marshall et al. |
| 4,511,886 | A | 4/1985 | Rodriguez |
| 4,737,847 | A | 4/1988 | Araki et al. |
| 5,005,083 | A | 4/1991 | Grage et al. |
| 5,097,328 | A | 3/1992 | Boyette |
| 5,164,827 | A | 11/1992 | Paff |
| 5,179,441 | A | 1/1993 | Anderson et al. |
| 5,216,502 | A | 6/1993 | Katz |
| 5,237,408 | A | 8/1993 | Blum et al. |
| 5,243,418 | A | 9/1993 | Kuno et al. |
| 5,258,837 | A | 11/1993 | Gormley et al. |
| 5,298,697 | A | 3/1994 | Suzuki et al. |
| 5,305,390 | A | 4/1994 | Frey et al. |
| 5,317,394 | A | 5/1994 | Hale et al. |
| 5,581,625 | A | 12/1996 | Connell |

(Continued)

FOREIGN PATENT DOCUMENTS

| | | |
|---|---|---|
| EP | 0 529 317 | 3/1993 |
| EP | 0 714 081 | 5/1996 |

(Continued)

OTHER PUBLICATIONS

Bui, H. H., et al., (2000) "A probalistic framework for tracking in wide-area environments" Pattern Recognition, Proceedings, 15th International Conference on Sep. 3-7, 2000: [Proceedings of the international conference on pattern recognition. (icpr)], Los Almaitos, CA, USA, *IEEE*, Computer Soc., Us, vol. 4, pp. 702-705 (4 pages.).

(Continued)

*Primary Examiner* — Luong T Nguyen
(74) *Attorney, Agent, or Firm* — Goodwin Procter LLP

(57) ABSTRACT

Methods and systems for creating video from multiple sources utilize intelligence to designate the most relevant sources, facilitating their adjacent display and/or catenation of their video streams.

15 Claims, 7 Drawing Sheets

U.S. PATENT DOCUMENTS

| | | | |
|---|---|---|---|
| 5,666,157 | A | 9/1997 | Aviv |
| 5,699,444 | A | 12/1997 | Palm |
| 5,729,471 | A | 3/1998 | Jain et al. |
| 5,734,737 | A | 3/1998 | Chang et al. |
| 5,745,126 | A | 4/1998 | Jain et al. |
| 5,845,009 | A | 12/1998 | Marks et al. |
| 5,920,338 | A | 7/1999 | Katz |
| 5,956,081 | A | 9/1999 | Katz et al. |
| 5,969,755 | A | 10/1999 | Courtney |
| 5,973,732 | A | 10/1999 | Guthrie |
| 6,002,995 | A | 12/1999 | Suzuki et al. |
| 6,028,626 | A | 2/2000 | Aviv |
| 6,049,363 | A | 4/2000 | Courtney et al. |
| 6,061,088 | A | 5/2000 | Khosravi et al. |
| 6,069,655 | A | 5/2000 | Seeley et al. |
| 6,075,560 | A | 6/2000 | Katz |
| 6,091,771 | A | 7/2000 | Seeley et al. |
| 6,097,429 | A | 8/2000 | Seeley et al. |
| 6,185,314 | B1 | 2/2001 | Crabtree et al. |
| 6,188,777 | B1 | 2/2001 | Darrell et al. |
| 6,237,647 | B1 | 5/2001 | Pong et al. |
| 6,285,746 | B1 | 9/2001 | Duran et al. |
| 6,295,367 | B1 | 9/2001 | Crabtree et al. |
| 6,359,647 | B1 | 3/2002 | Sengupta et al. |
| 6,377,296 | B1 | 4/2002 | Zlatsin et al. |
| 6,396,535 | B1 | 5/2002 | Waters |
| 6,400,830 | B1 | 6/2002 | Christian et al. |
| 6,400,831 | B2 | 6/2002 | Lee et al. |
| 6,437,819 | B1 | 8/2002 | Loveland |
| 6,441,846 | B1 | 8/2002 | Carlbom et al. |
| 6,442,476 | B1 | 8/2002 | Poropat |
| 6,456,320 | B2 | 9/2002 | Kuwano et al. |
| 6,456,730 | B1 | 9/2002 | Taniguchi |
| 6,476,858 | B1 | 11/2002 | Ramirez Diaz et al. |
| 6,483,935 | B1 | 11/2002 | Rostami et al. |
| 6,502,082 | B1 | 12/2002 | Toyama et al. |
| 6,516,090 | B1 | 2/2003 | Lennon et al. |
| 6,522,787 | B1 | 2/2003 | Kumar et al. |
| 6,526,156 | B1 | 2/2003 | Black et al. |
| 6,549,643 | B1 | 4/2003 | Toklu et al. |
| 6,549,660 | B1 | 4/2003 | Lipson et al. |
| 6,570,608 | B1 | 5/2003 | Tserng |
| 6,574,353 | B1 | 6/2003 | Schoepflin et al. |
| 6,580,821 | B1 | 6/2003 | Roy |
| 6,591,005 | B1 | 7/2003 | Gallagher |
| 6,698,021 | B1 | 2/2004 | Amini et al. |
| 6,731,805 | B2 | 5/2004 | Brodsky et al. |
| 6,791,603 | B2 | 9/2004 | Lazo et al. |
| 6,798,445 | B1 | 9/2004 | Brumitt et al. |
| 6,798,897 | B1 | 9/2004 | Rosenberg |
| 6,813,372 | B2 | 11/2004 | Standridge et al. |
| 6,972,787 | B1 | 12/2005 | Allen et al. |
| 7,023,913 | B1 | 4/2006 | Monroe |
| 7,698,450 | B2 * | 4/2010 | Monroe et al. ................ 709/231 |
| 7,746,380 | B2 | 6/2010 | Maruya et al. |
| 7,784,080 | B2 | 8/2010 | Renkis |
| 7,796,154 | B2 | 9/2010 | Senior et al. |
| 2001/0032118 | A1 | 10/2001 | Carter |
| 2002/0140722 | A1 | 10/2002 | Ayyar et al. |
| 2002/0159635 | A1 | 10/2002 | Hill et al. |
| 2003/0025599 | A1 | 2/2003 | Monroe |
| 2003/0025800 | A1 | 2/2003 | Hunter et al. |
| 2003/0040815 | A1 | 2/2003 | Pavlidis |
| 2003/0053658 | A1 | 3/2003 | Pavlidis |
| 2003/0058111 | A1 | 3/2003 | Lee et al. |
| 2003/0058237 | A1 | 3/2003 | Lee |
| 2003/0058341 | A1 | 3/2003 | Brodsky et al. |
| 2003/0058342 | A1 | 3/2003 | Trajkovic |
| 2003/0071891 | A1 | 4/2003 | Geng |
| 2003/0103139 | A1 | 6/2003 | Pretzer et al. |
| 2003/0123703 | A1 | 7/2003 | Pavlidis et al. |
| 2003/0174773 | A1 * | 9/2003 | Comaniciu et al. ...... 375/240.08 |
| 2003/0197612 | A1 | 10/2003 | Tanaka et al. |
| 2003/0197785 | A1 | 10/2003 | White et al. |
| 2004/0081895 | A1 | 4/2004 | Adachi et al. |
| 2004/0130620 | A1 | 7/2004 | Buehler et al. |
| 2004/0155960 | A1 | 8/2004 | Wren et al. |
| 2004/0160317 | A1 | 8/2004 | McKeown et al. |
| 2004/0164858 | A1 | 8/2004 | Lin |
| 2004/0252197 | A1 | 12/2004 | Fraley et al. |
| 2005/0012817 | A1 * | 1/2005 | Hampapur et al. ........... 348/143 |
| 2005/0017071 | A1 | 1/2005 | Noonan |
| 2005/0073418 | A1 | 4/2005 | Kelliher et al. |
| 2005/0073585 | A1 * | 4/2005 | Ettinger et al. ............... 348/155 |
| 2005/0078006 | A1 | 4/2005 | Hutchins et al. |
| 2005/0102183 | A1 | 5/2005 | Kelliher et al. |
| 2005/0185823 | A1 * | 8/2005 | Brown et al. ................. 382/103 |
| 2006/0004579 | A1 | 1/2006 | Claudatos et al. |
| 2010/0002082 | A1 | 1/2010 | Buehler et al. |

FOREIGN PATENT DOCUMENTS

| | | |
|---|---|---|
| EP | 0 967 584 | 12/1999 |
| EP | 1 189 187 | 3/2002 |
| JP | 8011071 | 1/1996 |
| WO | WO-9704428 | 2/1997 |
| WO | WO-0146923 | 6/2001 |
| WO | WO-0182626 | 11/2001 |
| WO | WO-2004034347 | 4/2004 |
| WO | WO-2004081895 | 9/2004 |

OTHER PUBLICATIONS

Examination Report for Canadian Application No. 2,505,831 issued by the Canadian Intellectual Property Office on Feb. 29, 2012 (4 pages).

Gallagher, Andrew C., (2002),"A ground truth based vanishing point detection algorithm", *The Journal of the Pattern Recognition Society*, Electronic Imaging Products, Eastman Kodak Company, vol. 35, pp. 1527-1543.

Kettnaker, V., et al., (1999), "Bayesian Mutli-camera Surveillance", *IEEE* , Computer Science Department, Cornell University, (7 pages).

Makris, D., et al., (2003), "Automatic Learning of an Activity-Based Semantic Scene Model," The Information Engineering Centre, City University, London, UK, *The Computer Society*, (6 pages).

Olson, T. J., et al., (1997), "Moving Object Detection and Event Recognition Algorithms for Smart Cameras", *Texas Instruments Research and Development*, pp. 159-175.

Author unknown. "The Future of Security Systems" retrieved from the internet on May 24, 2005, http://www.activeye.com/; http://www.activeye.com/act_alert.htm; http://www.activeye.com/tech.htm; http://www.activeye.com/ae_team.htm; 7 pages.

Chang et al., "Tracking Multiple People with a Multi-Camera System," *IEEE*, 19-26 (2001).

Examination Report, European Application No. 06849739.5-2215, dated Feb. 6, 2009, 2 pages.

Examination Report, European Application No. 06849739.5-2215, dated Sep. 2, 2010, 4 pages.

Hampapur et al., "Face Cataloger: Multi-Scale Imaging for Relating Identity to Location," Proceedings of the IEEE Conference on Advanced Video and Signal based Surveillance, 2003 *IEEE*, 8 pages.

International Preliminary Report on Patentability for PCT/US2004/029417 dated Mar. 13, 2006, 1 page.

International Preliminary Report on Patentability for PCT/US2004/033177 dated Apr. 10, 2006, 1 page.

International Preliminary Report on Patentability for PCT/US2004/033168 dated Apr. 10, 2006, 1 page.

International Search Report for PCT/US2003/35943 dated Apr. 13, 2004, 7 pages.

International Search Report for PCT/US2004/29417 dated Apr. 8, 2005, 2 pages.

International Search Report for PCT/US2004/29418 dated Feb. 28, 2005, 3 pages.

International Search Report for PCT/US2004/033168 dated Feb. 25, 2005, 3 pages.

International Search Report for PCT/US2004/033177 dated Dec. 12, 2005, 6 pages.

International Search Report for PCT/US2006/010570, dated Sep. 12, 2007, 6 pages.

International Search Report for PCT/US2006/021087 dated Oct. 19, 2006, 4 pages.

Khan et al., "Human Tracking in Multiple Cameras," *IEEE*, 331-336 (2001).
Office Action, Japanese Application No. 2008-503,184, dated Aug. 4, 2010, 6 pages.
Office Action, Japanese Application No. 2008-503,184, dated Apr. 25, 2011, 4 pages.
Written Opinion of the International Searching Authority for PCT/US2004/29417 dated Apr. 8, 2005, 3 pages.
Written Opinion of the International Searching Authority for PCT/US2004/29418 dated Feb. 28, 2005, 5 pages.
Written Opinion of the International Searching Authority for PCT/US2004/033168, 4 pages, Apr. 3, 2005.
Written Opinion of the International Searching Authority for PCT/US2004/033177, 8 pages, Dec. 12, 2005.
Written Opinion of the International Searching Authority for PCT/US2006/010570, dated Sep. 12, 2007, 7 pages.
Written Opinion of the International Searching Authority for PCT/US2006/021087, dated Oct. 19, 2006, 5 pages.

* cited by examiner

300

MATRIX SUBSET 320

CURRENT CAMERA 305

NEXT CAMERA 310

| | 1 | 2 | 3 | 4 | 5 | 6 |
|---|---|---|---|---|---|---|
| 1 | x | 0.2 | 0.3 | 0.1 | 0.4 | 0 |
| 2 | 0.2 | x | 0 | 0.5 | 0.2 | 0 |
| 3 | 0.3 | 0.2 | x | 0 | 0 | 0.5 |
| 4 | 0.25 | 0.4 | 0 | x | 0 | 0.15 |
| 5 | 0.25 | 0.2 | 0 | 0.2 | x | 0.35 |
| 6 | 0 | 0 | 0.7 | 0 | 0.3 | x |

ADJACENCY PROBABILITY 315

FIG. 3

INTELLIGENT CAMERA SELECTION AND OBJECT TRACKING

CROSS-REFERENCE TO RELATED APPLICATIONS

This application is a continuation application of U.S. patent application Ser. No. 11/388,759, filed Mar. 24, 2006, which claims priority to U.S. Provisional Patent Application Ser. No. 60/665,314, filed Mar. 25, 2005, the entire disclosures of which are hereby incorporated by reference.

TECHNICAL FIELD

This invention relates to computer-based methods and systems for video surveillance, and more specifically to a computer-aided surveillance system capable of tracking objects across multiple cameras.

BACKGROUND INFORMATION

The current heightened sense of security and declining cost of camera equipment have increased the use of closed-circuit television (CCTV) surveillance systems. Such systems have the potential to reduce crime, prevent accidents, and generally increase security in a wide variety of environments.

As the number of cameras in a surveillance system increases, the amount of information to be processed and analyzed also increases. Computer technology has helped alleviate this raw data-processing task, resulting in a new breed of monitoring device—the computer-aided surveillance (CAS) system. CAS technology has been developed for various applications. For example, the military has used computer-aided image processing to provide automated targeting and other assistance to fighter pilots and other personnel. In addition, CAS has been applied to monitor activity in environments such as swimming pools, stores, and parking lots.

A CAS system monitors "objects" (e.g., people, inventory, etc.) as they appear in a series of surveillance video frames. One particularly useful monitoring task is tracking the movements of objects in a monitored area. To achieve more accurate tracking information, the CAS system can utilize knowledge about the basic elements of the images depicted in the series of video frames.

A simple surveillance system uses a single camera connected to a display device. More complex systems can have multiple cameras and/or multiple displays. The type of security display often used in retail stores and warehouses, for example, periodically switches the video feed displayed on a single monitor to provide different views of the property. Higher-security installations such as prisons and military installations use a bank of video displays, each showing the output of an associated camera. Because most retail stores, casinos, and airports are quite large, many cameras are required to sufficiently cover the entire area of interest. In addition, even under ideal conditions, single-camera tracking systems generally lose track of monitored objects that leave the field-of-view of the camera.

To avoid overloading human attendants with visual information, the display consoles for many of these systems generally display only a subset of all the available video data feeds. As such, many systems rely on the attendant's knowledge of the floor plan and/or typical visitor activities to decide which of the available video data feeds to display.

Unfortunately, developing a knowledge of a location's layout, typical visitor behavior, and the spatial relationships among the various cameras imposes a training and cost barrier that can be significant. Without intimate knowledge of the store layout, camera positions and typical traffic patterns, an attendant cannot effectively anticipate which camera or cameras will provide the best view, resulting in a disjointed and often incomplete visual records. Furthermore, video data to be used as evidence of illegal or suspicious activities (e.g., intruders, potential shoplifters, etc.) must meet additional authentication, continuity and documentation criteria to be relied upon in legal proceedings. Often criminal activities can span the fields-of-view of multiple cameras, and possibly be out of view of any camera for some period of time. Video that is not properly annotated with date, time, and location information, and which includes temporal or spatial interruptions may, not be reliable as evidence of an event or crime.

SUMMARY OF THE INVENTION

The invention generally provides for video surveillance systems, data structures, and video compilation techniques that model and take advantage of known or inferred relationships among video camera positions to select relevant video data streams for presentation and/or video capture. Both known physical relationships—a first camera being located directly around a corner from a second camera, for example—and observed relationships (e.g., historical data indicating the travel paths that people most commonly follow) can facilitate an intelligent selection and presentation of potential "next" cameras to which a subject may travel. This intelligent camera selection can therefore reduce or eliminate the need for users of the system to have any intimate knowledge of the observed property, thus lowering training costs, minimizing lost subjects, and increasing the evidentiary value of the video.

Accordingly, one aspect of the invention provides a video surveillance system including a user interface and a camera selection module. The user interface includes a primary camera pane that displays video image data captured by a primary video surveillance camera, and two or more camera panes that are proximate to the primary camera pane. Each of the proximate camera panes displays video data captured by one of a set of secondary video surveillance cameras. In response to the video data displayed in the primary camera pane, the camera selection module determines the set of secondary video surveillance cameras, and in some cases determines the placement of the video data generated by the set of secondary video surveillance cameras in the proximate camera panes, and/or with respect to each other. The determination of which cameras are included in the set of secondary video surveillance cameras can be based on spatial relationships between the primary video surveillance camera and a set of video surveillance cameras, and/or can be inferred from statistical relationships (such as a likelihood-of-transition metric) among the cameras.

In some embodiments, the video image data shown in the primary camera pane is divided into two or more sub-regions, and the selection of the set of secondary video surveillance cameras is based on selection of one of the sub-regions, which selection may be performed, for example, using an input device (e.g., a pointer, a mouse, or a keyboard). In some embodiments, the input device may be used to select an object of interest within the video, such as a person, an item of inventory, or a physical location, and the set of secondary video surveillance cameras can be based on the selected object. The input device may also be used to select a video data feed from a secondary camera, thus causing the camera selection module to replace the video data feed in the primary camera pane with the video feed of the selected secondary camera, and thereupon to select a new set of secondary video data feeds for display in the proximate camera panes. In cases where the selected object moves (such as a person walking through a store), the set of secondary video surveillance cameras can be based on the movement (i.e., direction, speed, etc.) of the selected object. The set of secondary video surveillance cameras can also be based on the image quality of the selected object.

Another aspect of the invention provides a user interface for presenting video surveillance data feeds. The user interface includes a primary video pane for presenting a primary video data feed and a plurality of proximate video panes, each for presenting one of a subset of secondary video data feeds selected from a set of available secondary video data feeds. The subset is determined by the primary video data feed. The number of available secondary video data feeds can be greater than the number of proximate video panes. The assignment of video data feeds to adjacent video panes can be done arbitrarily, or can instead be based on a ranking of video data feeds based on historical data, observation, or operator selection.

Another aspect of the invention provides a method for selecting video data feeds for display, and includes presenting a primary video data feed in a primary video data feed pane, receiving an indication of an object of interest in the primary video pane, and presenting a secondary video data feed in a secondary video pane in response to the indication of interest. Movement of the selected object is detected, and based on the movement, the data feed from the secondary video pane replaces the data feed in the primary video pane. A new secondary video feed is selected for display in the secondary video pane. In some instances, the primary video data feed will not change, and the new secondary video data feed will simply replace another secondary video data feed.

The new secondary video data feed can be determined based on a statistical measure such as a likelihood-of-transition metric that represents the likelihood that an object will transition from the primary video data feed to the second. The likelihood-of-transition metric can be determined, for example, by defining a set of candidate video data feeds that, in some cases, represent a subset of the available data feeds and assigning to each feed an adjacency probability. In some embodiments, the adjacency probabilities can be based on predefined rules and/or historical data. The adjacency probabilities can be stored in a multi-dimensional matrix which can comprise dimensions based on the number of available data feeds, the time the matrix is being used for analysis, or both. The matrices can be further segmented into multiple sub-matrices, based, for example, on the adjacency probabilities contained therein.

Another aspect of the invention provides a method of compiling a surveillance video. The method includes creating a surveillance video using a primary video data feed as a source video data feed, changing the source video data feed from the primary video data feed to a secondary video data feed, and concatenating the surveillance video from the secondary video data feed. In some cases, an observer of the primary video data feed indicates the change from the primary video data feed to the secondary video data feed, whereas in some instances the change is initiated automatically based on movement within the primary video data feed. The surveillance video can be augmented with audio captured from an observer of the surveillance video and/or a video camera supplying the video data feed, and can also be augmented with text or other visual cues.

Another aspect of the invention provides a data structure organized as an N by M matrix for describing relationships among fields-of-view of cameras in a video surveillance system, where N represents a first set of cameras having a field-of-view in which an observed object is currently located and M representing a second set of cameras having a field-of-view into which the observed object is likely move. The entries in the matrix represent transitional probabilities between the first and second set of cameras (e.g., the likelihood that the object moves from a first camera to a second camera). In some embodiments, the transitional probabilities can include a time-based parameter (e.g., probabilistic function that includes a time component such as an exponential arrival rate), and in some cases N and M can be equal.

In another aspect, the invention comprises an article of manufacture having a computer-readable medium with the computer-readable instructions embodied thereon for performing the methods described in the preceding paragraphs. In particular, the functionality of a method of the present invention may be embedded on a computer-readable medium, such as, but not limited to, a floppy disk, a hard disk, an optical disk, a magnetic tape, a PROM, an EPROM, CD-ROM, or DVD-ROM. The functionality of the techniques may be embedded on the computer-readable medium in any number of computer-readable instructions, or languages such as, for example, FORTRAN, PASCAL, C, C++, Java, C#, Tcl, BASIC and assembly language. Further, the computer-readable instructions may, for example, be written in a script, macro, or functionally embedded in commercially available software (such as, e.g., EXCEL or VISUAL BASIC). The storage of data, rules, and data structures can be stored in one or more databases for use in performing the methods described above.

Other aspects and advantages of the invention will become apparent from the following drawings, detailed description, and claims, all of which illustrate the principles of the invention, by way of example only.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 3 is a representation of an adjacency matrix according to one embodiment of the invention.

DETAILED DESCRIPTION

Computer Aided Tracking

Intelligent video analysis systems have many applications. In real-time applications, such a system can be used to detect a person in a restricted or hazardous area, report the theft of a high-value item, indicate the presence of a potential assailant in a parking lot, warn about liquid spillage in an aisle, locate a child separated from his or her parents, or determine if a shopper is making a fraudulent return. In forensic applications, an intelligent video analysis system can be used to search for people or events of interest or whose behavior meets certain characteristics, collect statistics about people under surveillance, detect non-compliance with corporate policies in retail establishments, retrieve images of criminals' faces, assemble a chain of evidence for prosecuting a shoplifter, or collect information about individuals' shopping habits. One important tool for accomplishing these tasks is the ability to follow a person as he traverses a surveillance area and to create a complete record of his time under surveillance.

Figure 1:
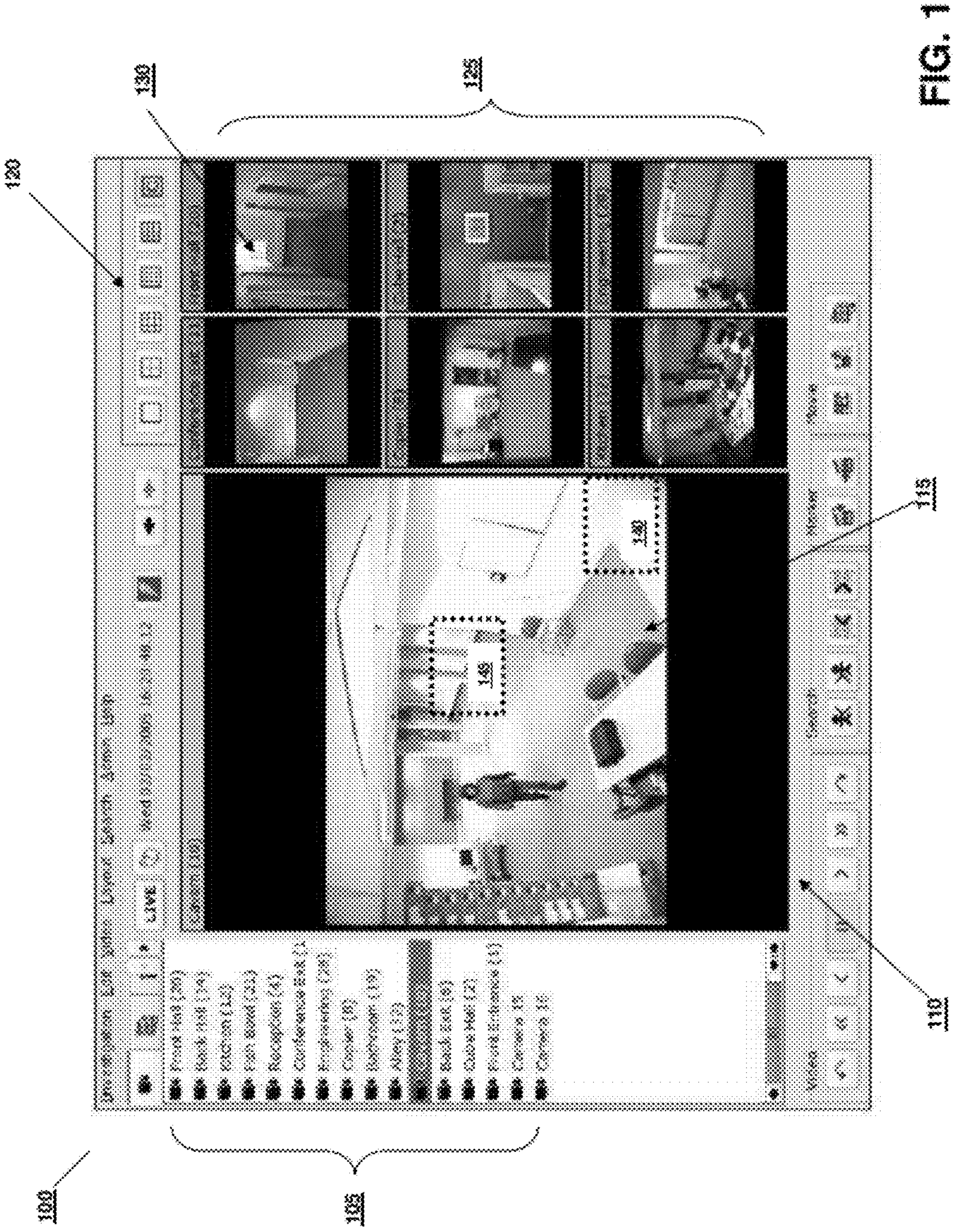
FIG. 1 is a screen capture of a user interface for capturing video surveillance data according to one embodiment of the invention.

Referring to FIG. 1 and in accordance with one embodiment of the invention, an application screen 100 includes a listing 105 of camera locations, each element of the list 105 relating to a camera that generates an associated video data feed. The camera locations may be identified, for example, by number (camera #2), location (reception, GPS coordinates), subject (jewelry), or a combination thereof. In some embodiments, the listing 105 can also include sensor devices other than cameras, such as motion detectors, heat detectors, door sensors, point-of-sale terminals, radio frequency identification (RFID) sensors, proximity card sensors, biometric sensors, and the like. The screen 100 also includes a primary camera pane 110 for displaying a primary video data feed 115, which can be selected from one of the listed camera locations 105. The primary video data feed 115 displays video information of interest to a user at a particular time. In some cases, the primary data feed 115 can represent a live data feed (i.e., the user is viewing activities as they occur in real or near-real time), whereas other cases the primary data feed 115 represents previously recorded activities. The user can select the primary video data feed 115 from the list 105 by choosing a camera number, by noticing a person or event of interest and selecting it using a pointer or other such input apparatus, or by selecting a location (e.g., "Entrance") in the surveillance region. In some embodiments, the primary video data feed 115 is selected automatically based on data received from one or more sensor nodes, for example, by detecting activity on a particular camera, evaluating rule-based selection heuristics, changing the primary video data feed according to a pre-defined schedule (e.g., in a particular order or at random), determining that an alert condition exists, and/or according to arbitrary programmable criteria.

The application screen 100 also includes a set of layout icons 120 that allow the user to select a number of secondary data feeds to view, as well as their positional layouts on the screen. For example, the selection of an icon indicating six adjacency screens instructs the system to configure a proximate camera area 125 with six adjacent video panes 130 that display video data feeds from cameras identified as "adjacent to" the camera whose video data feed appears in the primary camera pane 110. Each pane (both primary 110 and adjacent 130) can be different sizes and shapes, in some cases depending on the information being displayed. Each pane 110, 130 can show video from any source (e.g., visible light, infrared, thermal), with possibly different frame rates, encodings, resolutions, or playback speeds. The system can also overlay information on top of the video panes 110, 130, such as a date/time indicator, camera identifier, camera location, visual analysis results, object indicators (e.g., price, SKU number, product name), alert messages, and/or geographic information systems (GIS) data.

In some embodiments, objects within the video panes 110, 130 are classified based on one or more classification criteria. For example, in a retail setting, a certain merchandise can be assigned a shrinkage factor representing a loss rate for the merchandise prior to a point of sale, generally due to theft. Using shrinkage statistics (generally expressed as a percentage of units or dollars sold), objects with exceptionally high shrinkage rates can be highlighted in the video panes 110, 130 using bright colors, outlines or other annotations to focus the attention of a user on such objects. In some cases, the video panes 110, 130 presented to the user can be selected based on an unusually high concentration of such merchandise, or the gathering of one or more suspicious people near the merchandise. As an example, due to their relative small size and high cost, razor cartridges for certain shaving razors are known to be high theft items. Using the technique described above, a display rack holding such cartridges can be identified as an object of interest. When there are no store patrons near the display, the video feed from the camera monitoring the display need not be shown on any of the displays 110, 130. However, as patrons near the display, the system identifies a transitory object (likely a store patron) in the vicinity of the display, and replaces one of the video feeds 130 in the proximate camera area 125 with the display from that camera. If the user determines the behavior of the patron to be suspicious, she can instruct the system to place that data feed in the primary video pane 110.

The video data feed from an individual adjacent camera may be placed within a video pane 130 of the proximate camera area 125 according to one or more rules governing both the selection and placement of video data feeds within the proximate camera area 125. For example, where a total of 18 cameras are used for surveillance, but only six data feeds can be shown in the proximate camera area 125, each of the 18 cameras can be ranked based the likelihood that a subject being followed through the video will transition from the view of the primary camera to the view of each of the other seventeen cameras. The cameras with the six (or other number depending on the selected screen layout) highest likelihoods of transition are identified, and the video data feeds from each of the identified cameras are placed in the available video data panes 130 within the proximate camera area 125.

In some cases, the placement of the selected video data feeds in a video data pane 130 may be decided arbitrarily. In some embodiments the video data feeds are placed based on a likelihood ranking (e.g., the most likely "next camera" being placed in the upper left, and least likely in the lower right), the physical relationships among the cameras providing the video data feeds (e.g., the feeds of cameras placed to the left of the camera providing the primary data feed appear in the left-side panes of the proximate camera area 125), or in some cases a user-specified placement pattern. In some embodiments, the selection of secondary video data feeds and their placement in the proximate camera area 125 is a combination of automated and manual processes. For example, each secondary video data feed can be automatically ranked based on a "likelihood-of-transition" metric.

One example of a transition metric is a probability that a tracked object will move from the field-of-view of the camera supplying the primary data feed 115 to the field-of-view of the cameras providing each of the secondary video data feeds. The first N of these ranked video data feeds can then be selected and placed in the first N secondary video data panes 130 (in counter-clockwise order, for example). However, the user may disagree with some of the automatically determined rankings, based, for example, on her knowledge of the specific implementation, the building, or the object being monitored. In such cases, she can manually adjust the automatically determined rankings (in whole or in part) by moving video data feeds up or down in the rankings. After adjustment, the first N ranked video data feeds are selected as before, with the rankings reflecting a combination of automatically calculated and manually specified rankings. The user may also disagree with how the ranked data feeds are placed in the secondary video data panes 130 (e.g., she may prefer clockwise to counter-clockwise). In this case, she can specify how the ranked video data feeds are placed in secondary video data panes 130 by assigning a secondary feed to a particular secondary pane 130.

The selection and placement of a set of secondary video data feeds to include in the proximate camera area 115 can be either statically or dynamically determined. In the static case, the selection and placement of the secondary video data feeds are predetermined (e.g., during system installation) according to automatic and/or manual initialization processes and do not change over time (unless a re-initialization process is performed). In some embodiments, the dynamic selection and placement of the secondary video data feeds can be based on one or more rules, which in some cases can evolve over time based on external factors such as time of day, scene activity and historical observations. The rules can be stored in a central analysis and storage module (described in greater detail below) or distributed to processing modules distributed throughout the system. Similarly, the rules can be applied against pre-recorded and/or live video data feeds by a central rules-processing engine (using, for example, a forward-chaining rule model) or applied by multiple distributed processing modules associated with different monitored sites or networks.

For example, the selection and placement rules that are used when a retail store is open may be different than the rules used when the store is closed, reflecting the traffic pattern differences between daytime shopping activity and nighttime restocking activity. During the day, cameras on the shopping floor would be ranked higher than stockroom cameras, while at night loading dock, alleyway, and/or stockroom cameras can be ranked higher. The selection and placement rules can also be dynamically adjusted when changes in traffic patterns are detected, such as when the layout of a retail store is modified to accommodate new merchandising displays, valuable merchandise is added, and/or when cameras are added or moved. Selection and placement rules can also change based on the presence of people or the detection of activity in certain video data feeds, as it is likely that a user is interested in seeing video data feeds with people or activity.

The data feeds included in the proximate camera area 115 can also be based on a determination of which cameras are considered "adjacencies" of the camera being viewed in the primary video pane 110. A particular camera's adjacencies generally include other cameras (and/or in some cases other sensing devices) that are in some way related to that camera. As one example, a set of cameras may be considered "adjacent" to a primary camera if a user viewing the primary camera will most likely to want to see that set of cameras next or simultaneously, due to the movement of a subject among the fields-of-view of those cameras. Two cameras may also be considered adjacent if a person or object seen by one camera is likely to appear (or is appearing) on the other camera within a short period of time. The period of time may be instantaneous (i.e., the two cameras both view the same portion of the environment), or in some cases there may be a delay before the person or object appears on the other camera. In some cases, strong correlations among cameras are used to imply adjacencies based on the application of rules (either centrally stored or distributed) against the received video feeds, and in some cases users can manually modify or delete implied adjacencies if desired. In some embodiments, users manually specify adjacencies, thereby creating adjacencies which would otherwise seem arbitrary. For example, two cameras placed at opposite ends of an escalator may not be physically close together, but they would likely be considered "adjacent" because a person will typically pass both cameras as they use the escalator.

Adjacencies can also be determined based on historical data, either real, simulated, or both. In one embodiment, user activity is observed and measured, for example, determining which video data feeds the user is most likely to select next based on previous selections. In another embodiment, the camera images are directly analyzed to determine adjacencies based on scene activity. In some embodiments, the scene activity can be choreographed or constrained using training data. For example, a calibration object can be moved through various locations within a monitored site. The calibration object can be virtually any object with known characteristics, such as a brightly colored ball, a black-and-white checked cube, a dot of laser light, or any other object recognizable by the monitoring system. If the calibration object is detected at (or near) the same time on two cameras, the cameras are said to have overlapping (or nearly overlapping) fields-of-view, and thus are likely to be considered adjacent. In some cases, adjacencies may also be specified, either completely or partially, by the user. In some embodiments, adjacencies are computed by continuously correlating object activity across multiple camera views as described in commonly-owned co-pending U.S. patent application Ser. No. 10/660,955, "Computerized Method and Apparatus for Determining Field-Of-View Relationships Among Multiple Image Sensors," the entire disclosure of which is incorporated by reference herein.

One implementation of an "adjacency compare" function for determining secondary cameras to be displayed in the proximate camera area is described by the following pseudocode:

```
bool IsOverlap(time)
{
    // consider two cameras to overlap
    // if the transition time is less than 1 second
    return time < 1;
}
bool CompareAdjacency(prob1, time1, count1, prob2, time2, count2)
{
    if(IsOverlap(time1) == IsOverlap(time2))
    {
        // both overlaps or both not
        if(count1 == count2)
            return prob1 > prob2;
        else
            return count1 > count2;
    }
    else
    {
        // one is overlap and one is not, overlap wins
        return time1 < time2;
    }
}
```

Adjacencies may also be specified at a finer granularity than an entire scene by defining sub-regions 140, 145 within a video data pane. In some embodiments, the sub-regions can be different sizes (e.g., small regions for distant areas, and large regions for closer areas). In one embodiment, each video data pane can be subdivided into 16 sub-regions arranged in a 4×4 regular grid and adjacency calculations based on these sub-regions. Sub-regions can be any size or shape—from large areas of the video data pane down to individual pixels and, like full camera views, can be considered adjacent to other cameras or sub-regions.

Sub-regions can be static or change over time. For example, a camera view can start with 256 sub-regions arranged in a 16×16 grid. Over time, the sub-region definitions can be refined based on the size and shape statistics of the objects seen on that camera. In areas where the observed objects are large, the sub-regions can be merged together into larger sub-regions until they are comparable in size to the objects within the region. Conversely, in areas where observed objects are small, the sub-regions can be further subdivided until they are small enough to represent the objects on a one-to-one (or near one-to-one) basis. For example, if multiple adjacent sub-regions routinely provide the same data (e.g., if when a first sub-region shows no activity and a second sub-region immediately adjacent to the first also shows no activity) the two sub-regions can be merged without losing any granularity. Such an approach reduces the storage and processing resources necessary. In contrast, if a single sub-region often includes more than one object that should be tracked separately, the sub-region can be divided into two smaller sub-regions. For example, if a sub-region includes the field-of-view of a camera monitoring a point-of-sale and includes both the clerk and the customer, the sub-region can be divided into two separate sub-regions, one for behind the counter and one for in front of the counter.

Sub-regions can also be defined based on image content. For example, the features (e.g., edges, textures, colors) in a video image can be used to automatically infer semantically meaningful sub-regions. For example, a hallway with three doors can be segmented into four sub-regions (one segment for each door and one for the hallway) by detecting the edges of the doors and the texture of the hallway carpet. Other segmentation techniques can be used as well, as described in commonly-owned co-pending U.S. patent application Ser. No. 10/659,454, "Method and Apparatus for Computerized Image Background Analysis," the entire disclosure of which is incorporated by reference herein. Furthermore, the two adjacent sub-regions may be different in terms of size and/or shape, e.g., due to the imaging perspective, what appears as a sub-region in one view may include the entirety of an adjacent view from a different camera.

The static and dynamic selection and placement rules described above for relationships between cameras can also be applied to relationships among sub-regions. In some embodiments, segmenting a camera's field-of-view into multiple sub-regions enables more sophisticated video feed selection and placement rules within the user interface. If a primary camera pane includes multiple sub-regions, each sub-region can be associated with one or more secondary cameras (or sub-regions within secondary cameras) whose video data feeds can be displayed in the proximate panes. If, for example, a user is viewing a video feed of a hallway in the primary video pane, the majority of the secondary cameras for that primary feed are likely to be located along the hallway. However, the primary video feed can include an identified sub-region that itself includes a light switch on one of the hallway walls, located just outside a door to a rarely-used hallway. When activity is detected within the sub-region (e.g., a person activating the light switch), the likelihood that the subject will transition to the camera in the connecting hallway increases, and as a result, the camera in the rarely-used hallway is selected as a secondary camera (and in some cases may even be ranked higher than other cameras adjacent to the primary camera).

Figure 2:
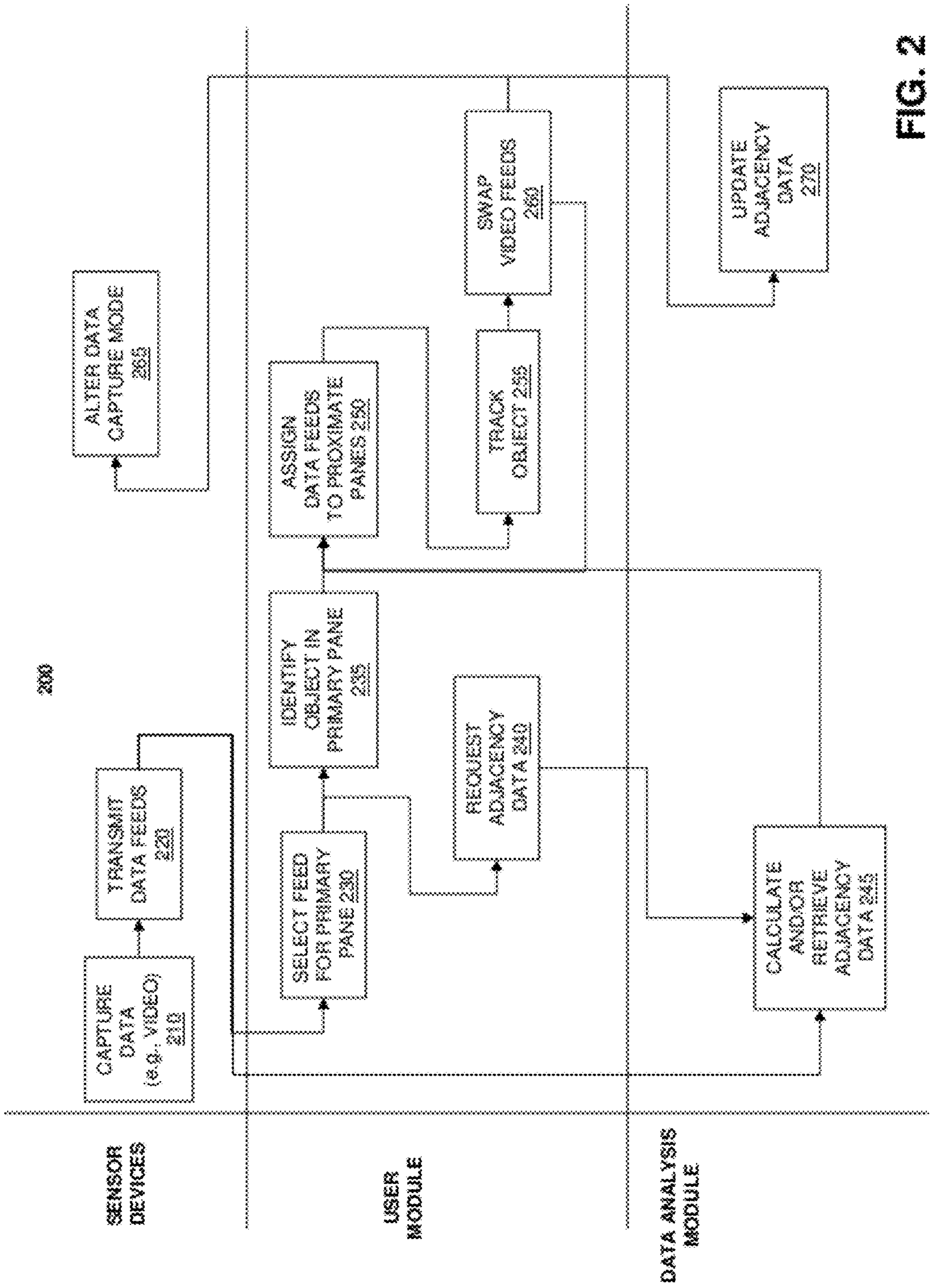
FIG. 2 is a flow chart depicting a method for capturing video surveillance data according to one embodiment of the invention.

FIG. 2 illustrates one exemplary set of interactions among sensor devices that monitor a property, a user module for receiving, recording and annotating data received from the sensor devices, and a central data analysis module using the techniques described above. The sensor devices capture data (such as video in the case of surveillance cameras) (STEP 210) and transmit (STEP 220) the data to the user module, and, in some cases, to the central data analysis module. The user (or, in cases where automated selection is enabled, the user module) selects (STEP 230) a video data feed for viewing in the primary viewing pane. While monitoring the primary video pane, the user identifies (STEP 235) an object of interest in the video and can track the object as it passes through the camera's field-of-view. The user then requests (STEP 240) adjacency data from the central data analysis module to allow the user module to present the list of adjacent cameras and their associated adjacency rankings. In some embodiments, the user module receives the adjacency data prior to the selection of a video feed for the primary video pane. Based on the adjacency data, the user assigns (STEP 250) secondary data feeds to one or more of the proximate data feed panes. As the object travels through the monitored area, the user tracks (STEP 255) the object and, if necessary, instructs the user module to swap (STEP 260) video feeds such that one of the video feeds from the proximate video feed pane becomes the primary data feed, and a new set of secondary data feeds are assigned (STEP 250) to the proximate video panes. In some cases, the user can send commands to the sensor devices to change (STEP 265) one or more data capture parameters such as camera angle, focus, frame rate, etc. The data can also be provided to the central data analysis module as training data for refining the adjacency probabilities.

Referring to FIG. 3, the adjacency probabilities can be represented as an n×n adjacency matrix 300, where n represents the number of sensor nodes (e.g., cameras in a system consisting entirely of video devices) in the system and the entries in the matrix represent the probability that an object being tracked will transition between the two sensor nodes. In this example, both axes list each camera within a surveillance system, with the horizontal axis 305 representing the current camera and the vertical axis 310 representing possible "next" cameras. The entries 315 in each cell represent the "adjacency probability" that an object will transition from the current camera to the next camera. As a specific example, an object being viewed with camera 1 has an adjacency probability of 0.25 with camera 5—i.e., there is a 25% chance that the object will move from the field-of-view of camera 1 to that of camera 5. In some cases, the sum of the probabilities for a camera will be 100%—i.e. all transitions from a camera can be accounted for and estimated. In other cases, the probabilities may not represent all possible transitions, as some cameras will be located at the boundary of a monitored environment and objects will transition into an unmonitored area.

In some cases, transitional probabilities can be computer for transitions among multiple (e.g., more than two) cameras. For example, one entry of the adjacency matrix can represent two cameras—i.e. the probability reflects the chance that an object moves from one camera to a second camera then on to a third, resulting in conditional probabilities based on the objects behavior and statistical correlations among each possible transition sequence. In embodiments where cameras have overlapping fields-of-view, the camera-to-camera transition probabilities can sum to greater than one, as transition probabilities would be calculated that represent a transition from more than one camera to a single camera, and/or from a single camera to two cameras (e.g., a person walks from a location covered by a field-of-view of camera A into a location covered by both camera B and C).

In some embodiments, one adjacency matrix 300 can be used to model an entire installation. However, in implementations with large numbers of sensing devices, the addition of sub-regions and implementations where adjacencies vary based on time or day of week, the size and number of the matrices can grow exponentially with the addition of each new sensing device and sub-region. Thus, there are numerous scenarios—such as large installations, highly distributed systems, and systems that monitor numerous unrelated locations—in which multiple smaller matrices can be used to model object transitions.

For example, subsets 320 of the matrix 300 can be identified that represent a "cluster" of data that is highly independent from the rest of the matrix 300 (e.g., there are few, if any, transitions from cameras within the subset to cameras outside the subset). Subset 320 may represent all of the possible transitions among a subset of cameras, and thus a user responsible for monitoring that site may only be interested in viewing data feeds from that subset, and thus only need the matrix subset 320. As a result, intermediate or local processing points in the system do not require the processing or storage resources to handle the entire matrix 300. Similarly, large sections of the matrix 200 can include zero entries which can be removed to further save storage, processing resources, and/or transmission bandwidth. One example is a retail store with multiple floors, where adjacency probabilities for cameras located between floors can be limited to cameras located at escalators, stairs and elevators, thus eliminating the possibility of erroneous correlations among cameras located on different floors of the building.

In some embodiments, a central processing, analysis and storage device (described in greater detail below) receives information from sensing devices (and in some cases intermediate data processing and storage devices) within the system and calculates a global adjacency matrix, which can be distributed to intermediate and/or sensor devices for local use. For example, a surveillance system that monitors a shopping mall may have dozens of cameras and sensor devices deployed throughout the mall and parking lot, and because of the high number (and possibly different recording and transmission modalities) of the devices, require multiple intermediate storage devices. The centralized analysis device can receive data streams from each storage device, reformat the data if necessary, and calculate a "mall-wide" matrix that describes transition probabilities across the entire installation. This matrix can then be distributed to individual monitoring stations if to provide the functionality described above.

Such methods can be applied on an even larger scale, such as a city-wide adjacency matrix, incorporating thousands of cameras, while still being able to operate using commonly-available computer equipment. For example, using a city's CCTV camera network, police may wish to reconstruct the movements of terrorists before, during and possibly after a terrorist attack such as a bomb detonation in a subway station. Using the techniques described above, individual entries of the matrix can be computed in real-time using only a small amount of information stored at various distributed processing nodes within the system, in some cases at the same device that captures and/or stores the recorded video. In addition, only portions of the matrix would be needed at any one time—cameras located far from the incident site are not likely to have captured any relevant data. For example, once the authorities know which subway stop where the perpetrators used to enter, the authorities then can limit their initial analysis to sub-networks near that stop. In some embodiments, the sub-networks can be expanded to include surrounding cameras based, for example, on known routes and an assumed speed of travel. The appropriate entries of the global adjacency matrix are computed, and tracking continues until the perpetrators reach a boundary of the sub-network, at which point, new adjacencies are computed and tracking continues.

Using such methods, the entire matrix does not need to be—although in some cases it may be—stored (or even computed) any one time. Only the identification of the appropriate sub-matrices is calculated in real time. In some embodiments, a sub-matrices exist a priori, and thus the entries would not need to be recalculated. In some embodiments, the matrix information can be compressed and/or encrypted to aid in transmission and storage and to enhance security of the system.

Similarly, a surveillance system that monitors numerous unrelated and/or distant locations may calculate a matrix for each location and distribute each matrix to the associated location. Expanding on the example of a shopping mall above, a security service may be hired to monitor multiple malls from a remote location—i.e., the users monitoring the video may not be physically located at any of the monitored locations. In such a case, the transition probability of an object moving immediately from the field-of-view of a camera at a first mall that of a second camera at a second mall, perhaps thousands of miles away, is virtually zero. As a result, separate adjacency matrices can be calculated for each mall and distributed to the mall's surveillance office, where local users can view the data feeds and take any necessary action. Periodic updates to the matrices can include updated transition probabilities based on new stores or displays, installations of new cameras, or other such events. Multiple matrices (e.g., matrices containing transition probabilities for different days and/or times as described above) can be distributed to a particular location.

In some embodiments, an adjacency matrix can include another matrix identifier as a possible transition destination. For example, an amusement park will typically have multiple cameras monitoring the park and the parking lot. However, the transition probability from any one camera within the park to any one camera within the parking lot is likely to be low, as there are generally only one or two pathways from the parking lot to the park. While there is little need to calculate transition probabilities among all cameras, it is still necessary to be able to track individuals as they move about the entire property. Instead of listing every camera in one matrix, therefore, two separate matrices can be derived. A first matrix for the park, for example, lists each camera from the park and one entry for the parking lot matrix. Similarly, a parking lot matrix lists each camera from the parking lot and an entry for the park matrix. Because of the small number of paths linking the park and the lot, it is likely that a relatively small subset of cameras will have significant transitional probabilities between the matrices. As an individual moves into the view of a park camera that is adjacent to a lot camera, the lot matrix can then be used to track the individual through the parking lot.

Movie Capture

Figure 4:
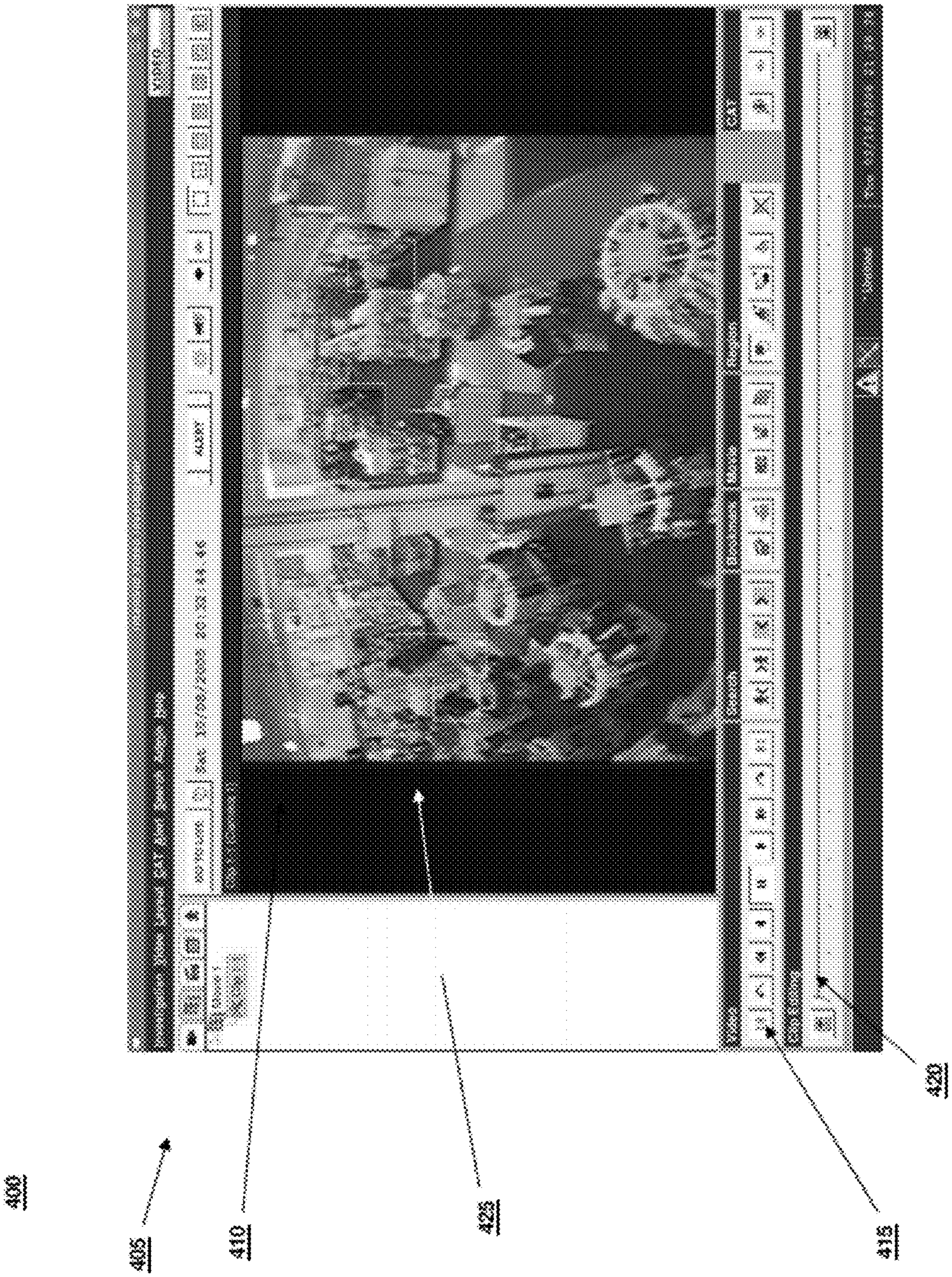
FIG. 4 is a screen capture of a user interface for creating a video surveillance movie according to one embodiment of the invention.

As events or subjects are captured by the sensing devices, video clips from the data feeds from the devices can be compiled into a multi-camera movie for storage, distribution, and later use as evidence. Referring to FIG. 4, an application screen 400 for capturing video surveillance data includes a video clip organizer 405, a main video viewing pane 410, a series of control buttons 415, and timeline object 420. In some embodiments, the proximate video panes of FIG. 1 can also be included.

The system provides a variety controls for the playback of previously recorded and/or live video and the selection of the primary video data feed during movie compilation. Much like a VCR, the system includes controls 415 for starting, pausing and stopping video playback. In some embodiments, the system may include forward and backward scan and/or skip features, allowing users to quickly navigate through the video. The video playback rate may be altered, ranging from slow motion (less than 1× playback speed) to fast-forward speed, such as 32× real-time speed. Controls are also provided for jumping forward or backward in the video, either in predefined increments (e.g., 30 seconds) by pushing a button or in arbitrary time amounts by entering a time or date. The primary video data feed can be changed at any time by selecting a new feed from one of the secondary video data feeds or by directly selecting a new video feed (e.g., by camera number or location). In some embodiments, the timeline object 420 facilitates editing the movie at specific start and end times of clips and provides fine-grained, frame-accurate control over the viewing and compilation of each video clip and the resulting movie.

As described above, as a tracked object 425 transitions from a primary camera to an adjacent camera (or sub-region to sub-region), the video data feed from the adjacent camera becomes the new primary video data feed (either automatically, or in some cases, in response to user selection). Upon transition to a new video feed, the recording of the first feed is stopped, and a first video clip is saved. Recording resumes using the new primary data feed, and a second clip is created using the video data feed from the new camera. The proximate video display panes are then populated with a new set of video data feeds as described above. Once the incident of interest is over or that a sufficient amount of video has been captured, the user stops the recording. Each of the various clips can then be listed in the clip organizer list 405 and concatenated into one movie. Because the system presented relevant cameras to the user for selection as the subject traveled through the camera views, the amount of time that the subject is out of view is minimized and the resulting movie provides a complete and accurate history of the event.

As an example of the movie creation process, consider the case of a suspicious-looking person in a retail store. The system operator first identifies the person and initiates the movie making process by clicking a "Start Movie" button, which starts compiling the first video clip. As the person walks around the store, he will transition from one surveillance camera to another. After he leaves the first camera, the system operator examines the video data feeds shown in the secondary panes, which, because of the pre-calculated adjacency probabilities, are presented such that the most likely next camera is readily available. When the suspect appears on one of the secondary feeds, the system operator selects that feed as the new primary video data feed. At this point, the first video clip is ended and stored, and the system initiates a second clip. A camera identifier, start time and end time of the first video clip are stored in the video clip organizer 405 associated with the current movie. The above process of selecting secondary video data feeds continues until the system operator has collected enough video of the suspicious person to complete his investigation. At this point, the system operator selects an "End Movie" button, and the movie clip list is saved for later use. The movie can be exported to a removable media device (e.g., CD-R or DVD-R), shared with other investigators, and/or used as training data for the current or subsequent surveillance systems.

Figure 5:
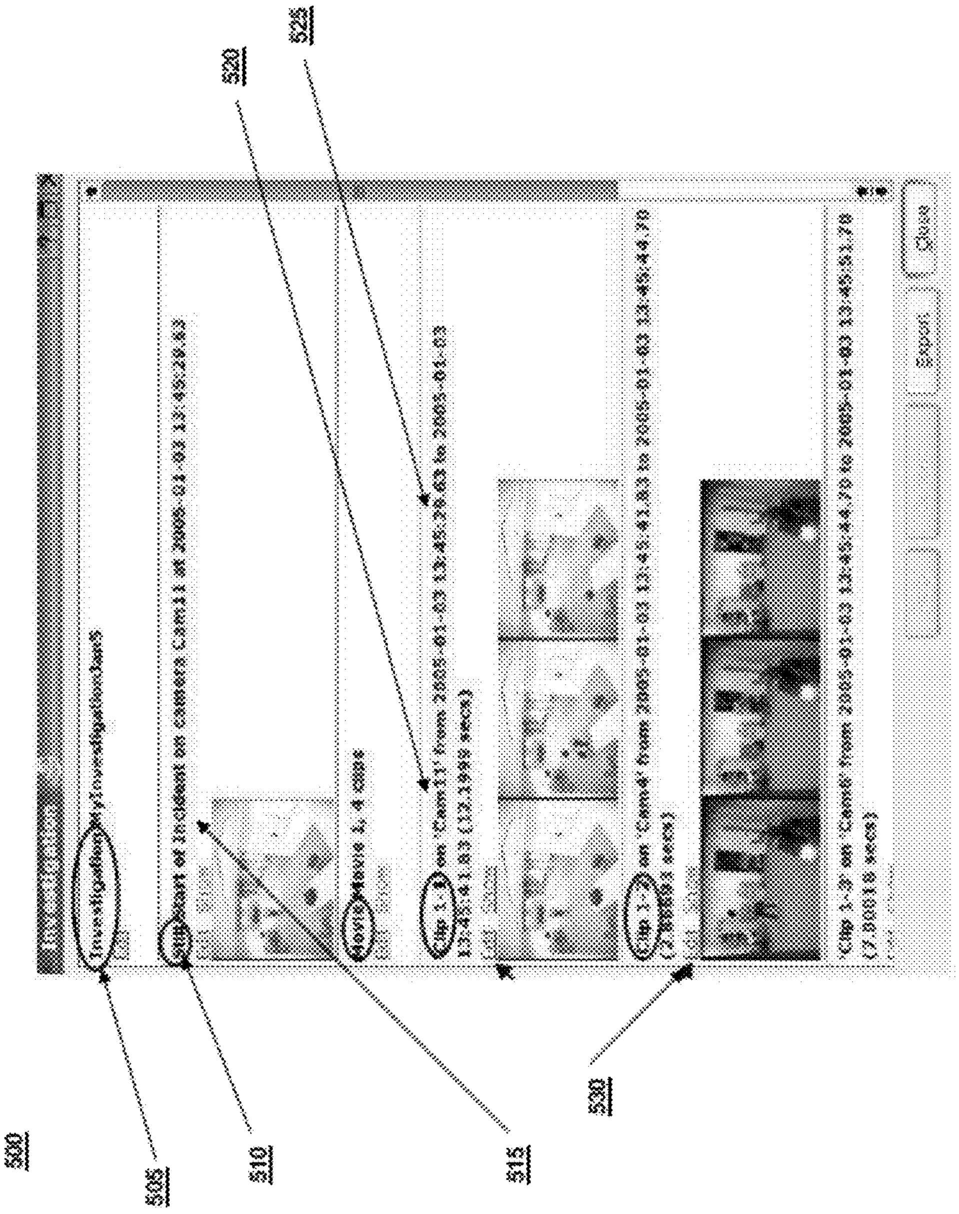
FIG. 5 is a screen capture of a user interface for annotating a video surveillance movie according to one embodiment of the invention.

Once the real-time or post-event movie is complete, the user can annotate the movie (or portions thereof) using voice, text, date, timestamp, or other data. Referring to FIG. 5, a movie editing screen 500 facilitates editing of the movie. Annotations such as titles 505 can be associated to the entire movie, still pictures added 510, and annotations 515 about specific incidents (e.g., "subject placing camera in left jacket pocket") can be associated with individual clips. Camera names 520 can be included in the annotation, coupled with specific date and time windows 525 for each clip. An "edit" link 530 allows the user to edit some or all of the annotations as desired.

Architecture

Figure 6:
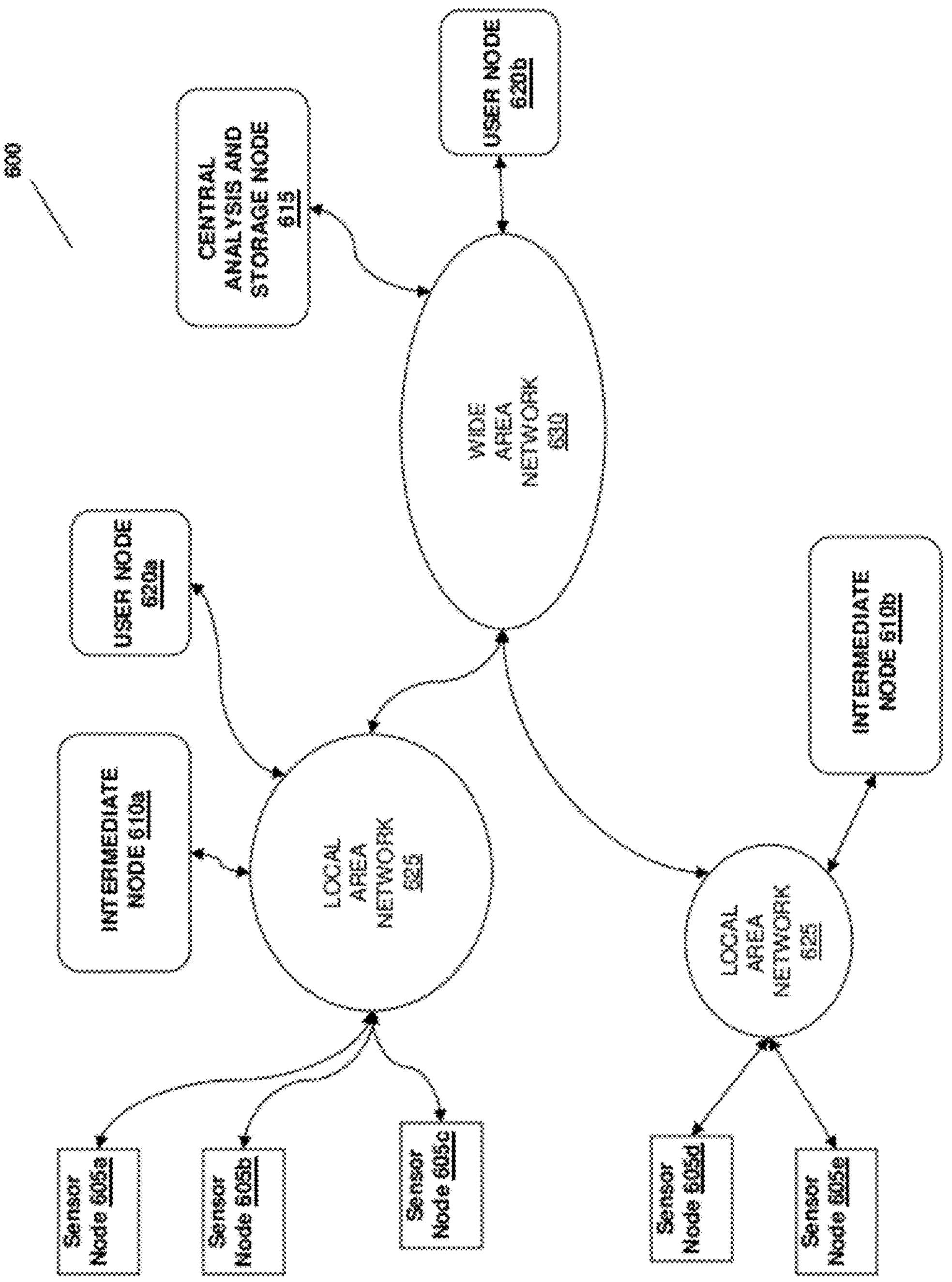
FIG. 6 is a block diagram of an embodiment of a multi-tiered surveillance system according to one embodiment of the invention.

Referring to FIG. 6, the topology of a video surveillance system using the techniques described above can be organized into multiple logical layers consisting of many edge nodes 605*a* through 605*e* (generally, 605), a smaller number of intermediate nodes 610*a* and 610*b* (generally, 610), and a single central node 615 for system-wide data review and analysis. Each node can be assigned one or more tasks in the surveillance system, such as sensing, processing, storage, input, user interaction, and/or display of data. In some cases, a single node may perform more than one task (e.g., a camera may include processing capabilities and data storage as well as performing image sensing).

The edge nodes 605 generally correspond to cameras (or other sensors) and the intermediate nodes 610 correspond to recording devices (VCRs or DVRs) that provide data to the centralized data storage and analysis node 615. In such a scenario, the intermediate nodes 610 can perform both the processing (video encoding) and storage functions. In an IP-based surveillance system, the camera edge nodes 605 can perform both sensing functions and processing (video encoding) functions, while the intermediate nodes 610 may only perform the video storage functions. An additional layer of user nodes 620*a* and 620*b* (generally, 620) may be added for user display and input, which are typically implemented using a computer terminal or web site 620*b*. For bandwidth reasons, the cameras and storage devices typically communicate over a local area network (LAN), while display and input devices can communicate over either a LAN or wide area network (WAN).

Examples of sensing nodes 605 include analog cameras, digital cameras (e.g., IP cameras, FireWire cameras, USB cameras, high definition cameras, etc.), motion detectors, heat detectors, door sensors, point-of-sale terminals, radio frequency identification (RFID) sensors, proximity card sensors, biometric sensors, as well as other similar devices. Intermediate nodes 610 can include processing devices such as video switches, distribution amplifiers, matrix switchers, quad processors, network video encoders, VCRs, DVRs, RAID arrays, USB hard drives, optical disk recorders, flash storage devices, image analysis devices, general purpose computers, video enhancement devices, de-interlacers, scalers, and other video or data processing and storage elements. The intermediate nodes 610 can be used for both storage of video data as captured by the sensing nodes 605 as well as data derived from the sensor data using, for example, other intermediate nodes 610 having processing and analysis capabilities. The user nodes 620 facilitate the interaction with the surveillance system and may include pan-tilt-zoom (PTZ) camera controllers, security consoles, computer terminals, keyboards, mice, jog/shuttle controllers, touch screen interfaces, PDAs, as well as displays for presenting video and data to users of the system such as video monitors, CRT displays, flat panel screens, computer terminals, PDAs, and others.

Sensor nodes 605 such as cameras can provide signals in various analog and/or digital formats, including, as examples only, Nation Television System Committee (NTSC), Phase Alternating Line (PAL), and Sequential Color with Memory (SECAM), uncompressed digital signals using DVI or HDMI connections, and/or compressed digital signals based on a common codec format (e.g., MPEG, MPEG2, MPEG4, or H.264). The signals can be transmitted over a LAN 625 and/or a WAN 630 (e.g., T1, T3, 56 kb, X.25), broadband connections (ISDN, Frame Relay, ATM), wireless links (802.11, Bluetooth, etc.), and so on. In some embodiments, the video signals may be encrypted using, for example, trusted key-pair encryption.

By adding computational resources to different elements (nodes) within the system (e.g., cameras, controllers, recording devices, consoles, etc.), the functions of the system can be performed in a distributed fashion, allowing more flexible system topologies. By including processing resources at each camera location (or some subset thereof), certain unwanted or redundant data facilitates the identification and filtering prior to the data being sent to intermediate or central processing locations, thus reducing bandwidth and data storage requirements. In addition, different locations may apply different rules for identifying unwanted data, and by placing processing resources capable of implementing such rules at the nodes closest to those locations (e.g., cameras monitoring a specific property having unique characteristics), any analysis done on downstream nodes includes less "noise."

Intelligent video analysis and computer aided-tracking systems such as those described herein provide additional functionality and flexibility to this architecture. Examples of such intelligent video surveillance system that performs processing functions (i.e., video encoding and single-camera visual analysis) and video storage on intermediate nodes are described in currently co-pending, commonly-owned U.S. patent application Ser. No. 10/706,850, entitled "Method And System For Tracking And Behavioral Monitoring Of Multiple Objects Moving Through Multiple Fields-Of-View," the entire disclosure of which is incorporated by reference herein. In such examples, a central node provides multi-camera visual analysis features as well as additional storage of raw video data and/or video meta-data and associated indices. In some embodiments, video encoding may be performed at the camera edge nodes and video storage at a central node (e.g., a large RAID array). Another alternative moves both video encoding and single-camera visual analysis to the camera edge nodes. Other configurations are also possible, including storing information on the camera itself.

Figure 7:
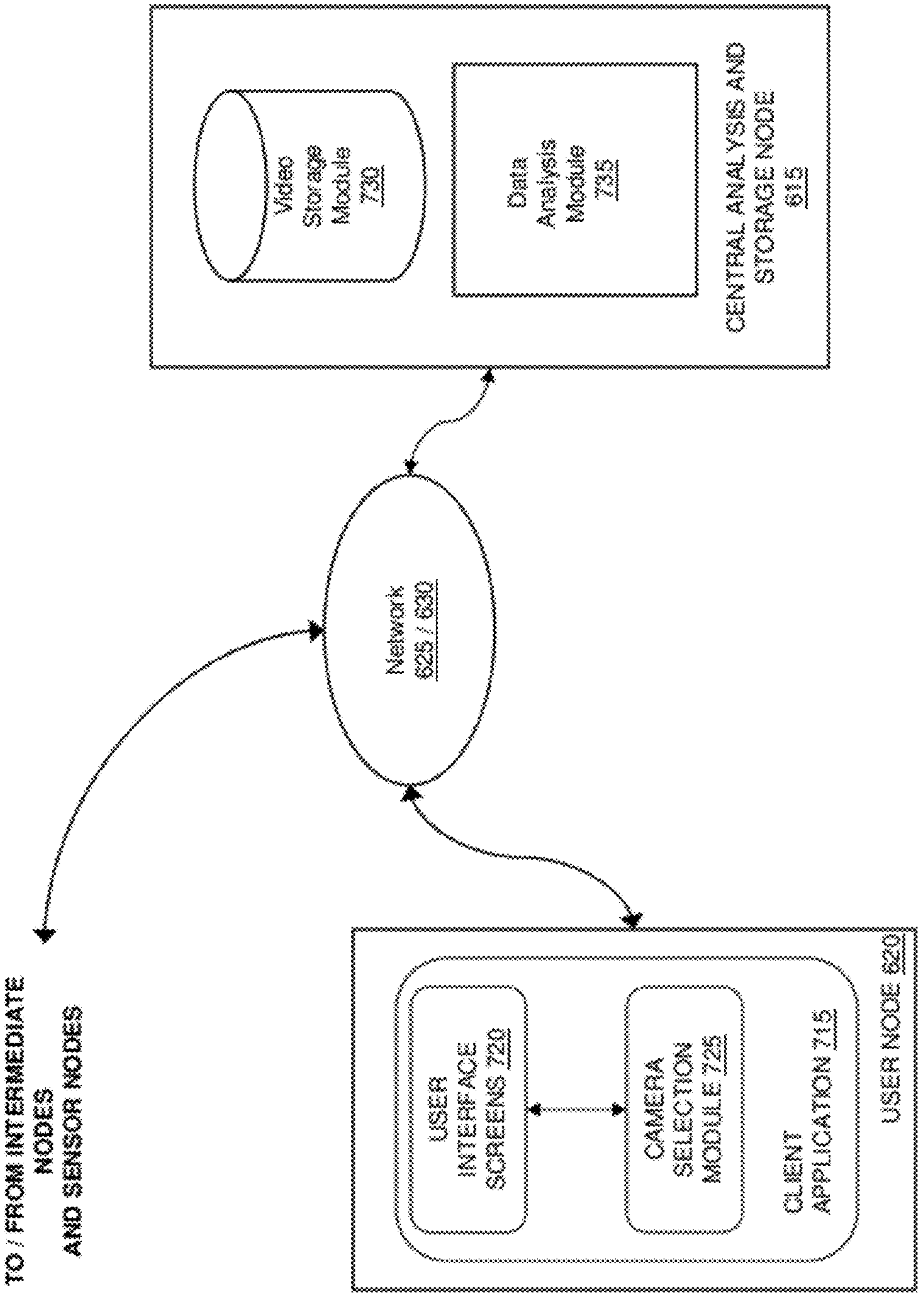
FIG. 7 is a block diagram of a surveillance system according to one embodiment of the invention.

FIG. 7 further illustrates the user node 620 and central analysis and storage node 615 of the video surveillance system of FIG. 6. In some embodiments, the user node 620 is implemented as software running on a personal computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH operating system from Apple Computer of Cupertino, Calif., and various varieties of Unix, such as SUN SOLARIS from SUN MICROSYSTEMS, and GNU/Linux from RED HAT, INC. of Durham, N.C. (and others). The user node 620 can also be implemented on such hardware as a smart or dumb terminal, network computer, wireless device, wireless telephone, information appliance, workstation, minicomputer, mainframe computer, or other computing device that operates as a general purpose computer, or a special purpose hardware device used solely for serving as a terminal 620 in the surveillance system.

The user node 620 includes a client application 715 that includes a user interface module 720 for rendering and presenting the application screens, and a camera selection module 725 for implementing the identification and presentation of video data feeds and movie capture functionality as described above. The user node 620 communicates with the sensor nodes and intermediate nodes (not shown) and the central analysis and storage module 615 over the network 625 and 630.

In one embodiment, the central analysis and storage node 615 includes a video storage module 730 for storing video captured at the sensor nodes, and a data analysis module 735 for determining adjacency probabilities as well as other functions such as storing and applying adjacency rules, calculating transition probabilities, and other functions. In some embodiments, the central analysis and storage node 615 determines which transition matrices (or portions thereof) are distributed to intermediate and/or sensor nodes, if, as described above, such nodes have the processing and storage capabilities described herein. The central analysis and storage node 615 is preferably implemented on one or more server class computers that have sufficient memory, data storage, and processing power and that run a server class operating system (e.g., SUN Solaris, GNU/Linux, and the MICROSOFT WINDOWS family of operating systems). Other types of system hardware and software than that described herein may also be used, depending on the capacity of the device and the number of nodes being supported by the system. For example, the server may be part of a logical group of one or more servers such as a server farm or server network. As another example, multiple servers may be associated or connected with each other, or multiple servers operating independently, but with shared data. In a further embodiment and as is typical in large-scale systems, application software for the surveillance system may be implemented in components, with different components running on different server computers, on the same server, or some combination.

In some embodiments, the video monitoring, object tracking and movie capture functionality of the present invention can be implemented in hardware or software, or a combination of both on a general-purpose computer. In addition, such a program may set aside portions of a computer's RAM to provide control logic that affects one or more of the data feed encoding, data filtering, data storage, adjacency calculation, and user interactions. In such an embodiment, the program may be written in any one of a number of high-level languages, such as FORTRAN, PASCAL, C, $C^{++}$, $C^{\#}$, Java, Tcl, or BASIC. Further, the program can be written in a script, macro, or functionality embedded in commercially available software, such as EXCEL or VISUAL BASIC. Additionally, the software could be implemented in an assembly language directed to a microprocessor resident on a computer. For example, the software can be implemented in Intel 80x86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EPROM, or CD-ROM.

While the invention has been particularly shown and described with reference to specific embodiments, it should be understood by those skilled in the area that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A video surveillance system comprising:

a user interface comprising:

a primary camera pane for displaying a primary video data feed captured by a primary video surveillance camera;

two or more camera panes in proximity to the primary camera pane, each proximate camera pane for displaying a secondary video data feed captured by one of a set of secondary video surveillance cameras, each secondary video surveillance camera having a different field of view; and a camera selection module for determining the set of secondary video surveillance cameras for display in the proximate camera panes in response to an object of interest being tracked in the primary video data feed displayed in the primary camera pane and statistical relationships between the primary video surveillance camera and the set of secondary video surveillance cameras, the statistical relationships comprising probabilities of the tracked object transitioning from the primary video surveillance camera to each of the secondary video surveillance cameras.

2. The system of claim 1 wherein the set of secondary video surveillance cameras is determined based on spatial relationships between the primary video surveillance camera and a plurality of video surveillance cameras.

3. The system of claim 1 wherein the primary video data feed displayed in the primary camera pane is divided into two or more sub-regions.

4. The system of claim 3 wherein the set of secondary video surveillance cameras is determined based on a selection of one of the two or more sub-regions.

5. The system of claim 3 further comprising an input device for facilitating selection of a sub-region of the primary video data feed displayed in the primary camera pane.

6. The system of claim 1 further comprising an input device for facilitating the selection of the object of interest within the primary video data feed shown in the primary camera pane.

7. The system of claim 6 wherein the set of secondary video surveillance cameras is determined based on the selected object of interest within the primary video data feed shown in the primary camera pane.

8. The system of claim 6 wherein the set of secondary video surveillance cameras is determined based on motion of the selected object of interest within the primary video data feed shown in the primary camera pane.

9. The system of claim 8 wherein the set of secondary video surveillance cameras is determined based at least in part on a likelihood-of-transition metric.

10. The system of claim 6 wherein the set of secondary video surveillance cameras is determined based on an image quality of the selected object of interest within the video data shown in the primary camera pane.

11. The system of claim 1 wherein the camera selection module further determines the placement of the two or more proximate camera panes with respect to each other.

12. The system of claim 1 further comprising an input device for selecting one of the secondary video data feeds and thereby causing the camera selection module to designate the selected secondary video data feed as the primary video data feed and determining a second set of secondary video data feeds to be displayed in the proximate camera panes.

13. A user interface for presenting video surveillance data feeds comprising:

a primary video pane for presenting a primary video data feed from a primary video surveillance camera; and a plurality of proximate video panes, each of the plurality of proximate video panes for presenting a second video data feed from one of a set of available secondary video data feeds, each from a respective secondary video surveillance camera having a different field of view, the presented secondary video data feeds being determined by an object of interest being tracked in the primary video data feed and statistical relationships between the primary video surveillance camera and the respective secondary video surveillance cameras, the statistical relationships comprising probabilities of the tracked object transitioning from the primary video surveillance camera to each of the respective secondary video surveillance cameras.

14. The user interface of claim 13 where the number of available secondary video data feeds is greater than the number of the proximate video panes.

15. The user interface of claim 13 wherein an assignment of video data feeds to the proximate video panes is based on a ranking of the video data feeds, the ranking based on the transition probabilities of the tracked object.

* * * * *